(12) United States Patent
Hsieh

(10) Patent No.: US 10,910,867 B2
(45) Date of Patent: Feb. 2, 2021

(54) AUTOMATIC ELECTRICITY RECHARGING DEVICE FOR FAN

(71) Applicant: Yu-Kun Hsieh, Tainan (TW)

(72) Inventor: Yu-Kun Hsieh, Tainan (TW)

( * ) Notice: Subject to any disclaimer, the term of this patent is extended or adjusted under 35 U.S.C. 154(b) by 272 days.

(21) Appl. No.: 16/182,666

(22) Filed: Nov. 7, 2018

(65) Prior Publication Data

US 2020/0144850 A1    May 7, 2020

(51) Int. Cl.
| | | |
|---|---|---|
| *H02J 7/14* | (2006.01) | |
| *H02K 11/04* | (2016.01) | |
| *F04D 25/06* | (2006.01) | |
| *H02K 11/00* | (2016.01) | |
| *F04D 19/00* | (2006.01) | |

(52) U.S. Cl.
CPC ............ *H02J 7/14* (2013.01); *F04D 25/0673* (2013.01); *H02J 7/1415* (2013.01); *H02K 11/0094* (2013.01); *H02K 11/044* (2013.01); *F04D 19/002* (2013.01)

(58) Field of Classification Search
CPC ... H02K 1/2786; H02J 7/1415; F04D 25/0673
See application file for complete search history.

(56) References Cited

U.S. PATENT DOCUMENTS

2003/0080711 A1 *  5/2003  Stearns .................. H02K 53/00
                                                                   320/101

* cited by examiner

*Primary Examiner* — Ramon M Barrera
(74) *Attorney, Agent, or Firm* — Alan D. Kamrath; Mayer & Williams PC

(57) ABSTRACT

An electricity recharging device includes a motor provided with an elongated shaft, a coil unit mounted on the motor, a rotary disk secured on the elongated shaft of the motor, a rectifier connected with the coil unit, and a storage battery connected with the rectifier. The coil unit includes at least one coil pole. The rotary disk encompasses the coil unit and has an interior provided with at least one magnet. Thus, when the motor is operated, the elongated shaft drives and rotates the rotary disk relative to the coil unit to produce a magnetic force and to generate an electric current that flows into the storage battery to prolong the usage time of the storage battery.

3 Claims, 6 Drawing Sheets

US 10,910,867 B2

AUTOMATIC ELECTRICITY RECHARGING DEVICE FOR FAN

BACKGROUND OF THE INVENTION

1. Field of the Invention

The present invention relates to an electricity recharging device and, more particularly, to an automatic electricity recharging device for a fan.

2. Description of the Related Art

A conventional fan comprises a motor, an impeller connected with the motor, and a plurality of blades mounted on the impeller. Thus, the fan blows air flow by rotation of the blades to provide air ventilating and circulating effects. However, the conventional fan cannot be used outdoors. Another conventional fan is additionally provided with a storage battery to provide an electric power to the motor. Thus, such a conventional fan can be operated outdoors. However, the electricity of the storage battery is exhausted during a period of time, so that the motor stops operating, and the storage battery has to be recharged by a socket, thereby causing inconvenience to the user.

BRIEF SUMMARY OF THE INVENTION

The primary objective of the present invention is to provide an electricity recharging device that recharges an electric power and prolongs the usage time of a storage battery.

In accordance with the present invention, there is provided an electricity recharging device comprising a motor, a coil unit mounted on the motor, a rotary disk mounted on the motor, a rectifier connected with the coil unit, and a storage battery connected with the rectifier. The motor has a front end provided with an elongated shaft. The coil unit is secured on a housing of the motor by screwing. The coil unit includes at least one coil pole. The rotary disk is secured on the elongated shaft of the motor and encompasses the coil unit. The rotary disk has an interior provided with at least one magnet. When the motor is operated, the elongated shaft drives and rotates the rotary disk relative to the coil unit. The rectifier has at least one first electric cord electrically connected with the coil unit, and at least one second electric cord electrically connected with the storage battery. The storage battery has at least one electric cord electrically connected with the motor.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
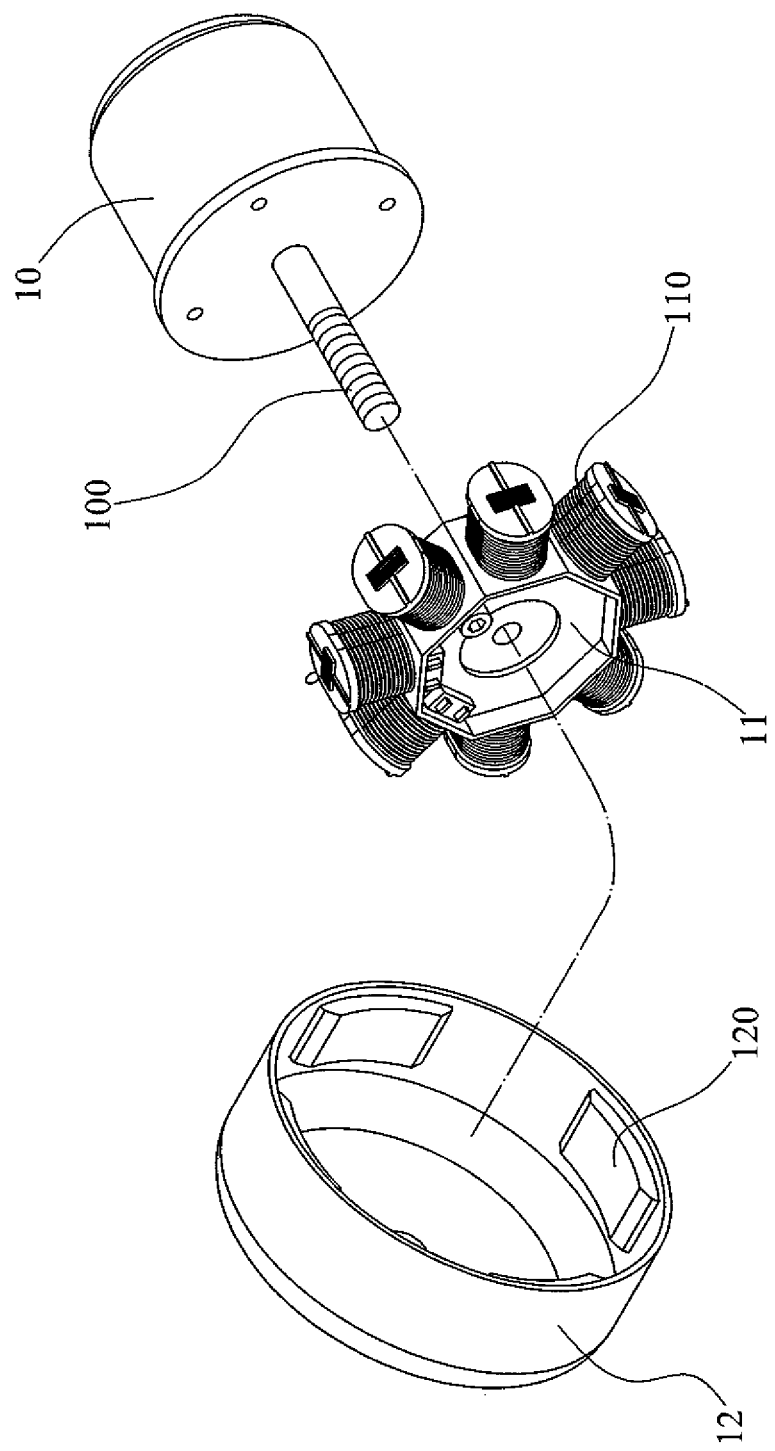
FIG. 1 is a partially exploded perspective view of an electricity recharging device in accordance with the preferred embodiment of the present invention.
Figure 2:
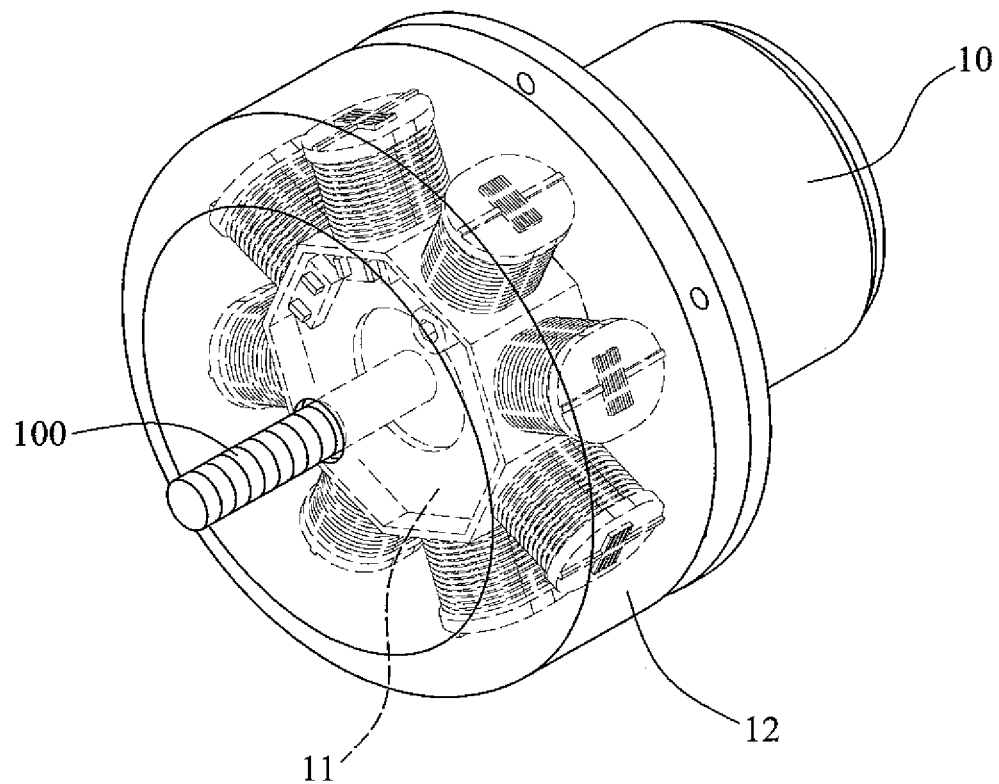
FIG. 2 is a perspective assembly view of the electricity recharging device as shown in FIG. 1.
Figure 3:
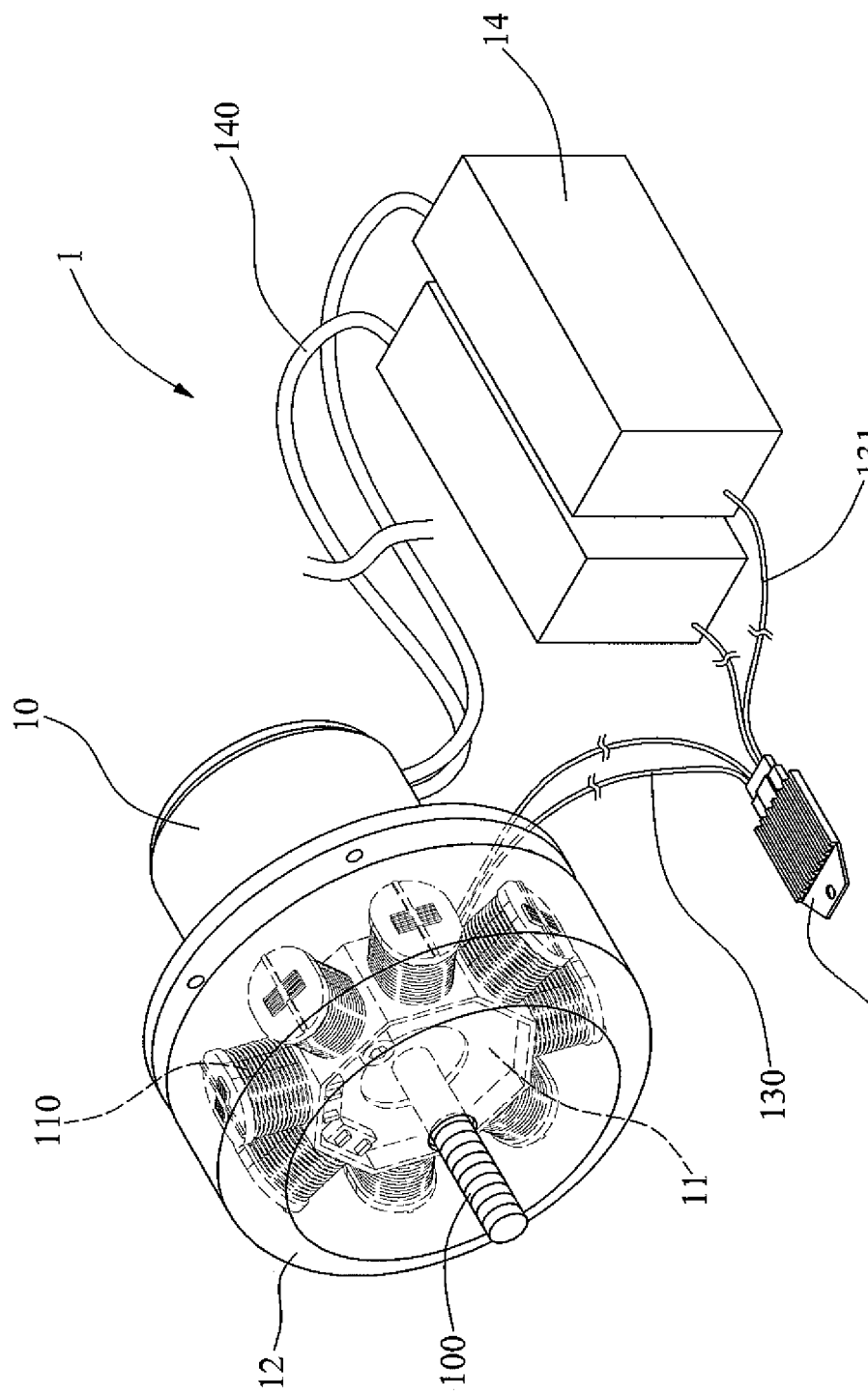
FIG. 3 is a perspective view of the electricity recharging device in accordance with the preferred embodiment of the present invention.

Referring to the drawings and initially to FIGS. 1-3, an automatic electricity recharging device 1 in accordance with the preferred embodiment of the present invention comprises a motor 10, a coil unit (or stator) 11 mounted on the motor 10, a rotary disk (or rotor) 12 mounted on the motor 10, a rectifier 13 connected with the coil unit 11, and a storage battery 14 connected with the rectifier 13.

The motor 10 has a front end provided with an elongated shaft 100. The coil unit 11 is secured on the motor 10. Preferably, the motor 10 has a housing located at the elongated shaft 100, and the coil unit 11 is secured on the housing of the motor 10 by screwing. The coil unit 11 includes at least one coil pole 110 having a plurality of coils. Preferably, the coil unit 11 includes a plurality of coil poles 110. The rotary disk 12 is secured on a front end of the elongated shaft 100 of the motor 10 and encompasses the coil unit 11. The rotary disk 12 has an interior provided with at least one magnet 120 aligning with the at least one coil pole 110 of the coil unit 11. Preferably, the rotary disk 12 has a plurality of magnet 120. When the motor 10 is operated, the elongated shaft 100 drives and rotates the rotary disk 12 relative to the coil unit 11. The rectifier 13 has at least one first electric cord 130 electrically connected with the coil unit 11, and at least one second electric cord 131 electrically connected with the storage battery 14. The storage battery 14 has at least one electric cord 140 electrically connected with the motor 10 to provide an electric power to the motor 10.

In the preferred embodiment of the present invention, a distance is defined between the at least one magnet 120 of the rotary disk 12 and the coil unit 11. Preferably, the distance is ranged between 0.6 mm and 1.2 mm.

In operation, when the motor 10 rotates the elongated shaft 100, the elongated shaft 100 drives and rotates the rotary disk 12, such that the at least one magnet 120 of the rotary disk 12 is rotated relative to the at least one coil pole 110 of the coil unit 11, and produces a magnetic field that is converted by a magnetic field conversion to form an electric current which passes through the rectifier 13 and flows into the storage battery 14 to charge the storage battery 14. Thus, the electric current is generated by a magnetic force (or effect) between the rotary disk 12 and the coil unit 11, and provides an electric power that is recharged into the storage battery 14 to prolong the usage time of the storage battery 14.

Figure 4:
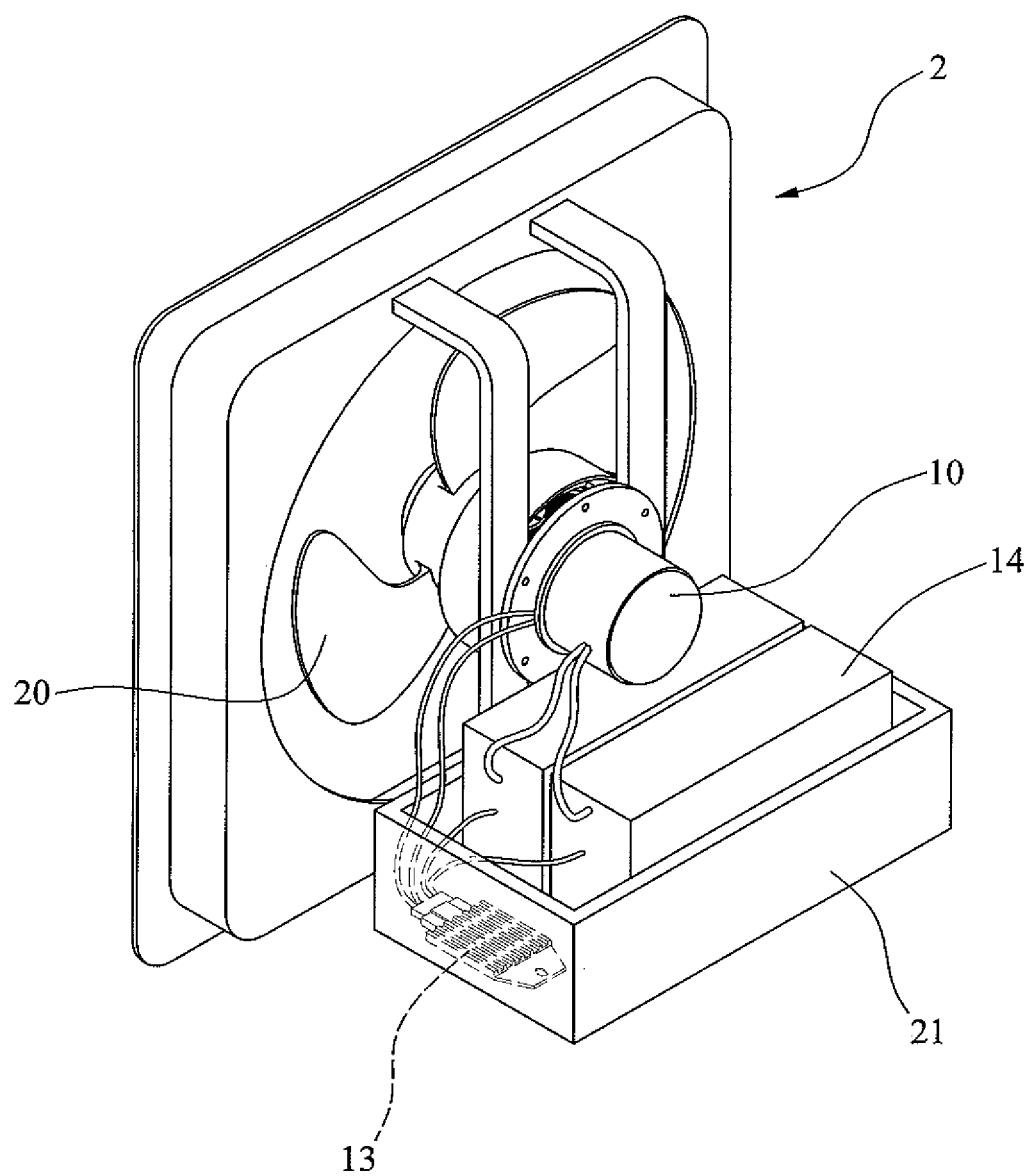
FIG. 4 is a perspective view showing the electricity recharging device for an exhaust fan.

Referring to FIG. 4 with reference to FIGS. 1-3, the automatic electricity recharging device 1 is assembled with an exhaust (or air draining) fan 2. The exhaust fan 2 includes an impeller 20, and a base 21. In assembly, the motor 10, the coil unit 11, and the rotary disk 12 are mounted in the exhaust fan 2, the impeller 20 is mounted on the front end of the motor 10, and the rectifier 13 and the storage battery 14 are placed in the base 21. In operation, when the motor 10 is operated, the elongated shaft 100 drives and rotates the impeller 20 of the exhaust fan 2 to produce an air flow. At the same time, the rotary disk 12 of the automatic electricity recharging device 1 is also driven and rotated by the elongated shaft 100, such that the at least one magnet 120 of the rotary disk 12 is rotated relative to the at least one coil pole 110 of the coil unit 11, and produces a magnetic field that is converted by a magnetic field conversion to form an electric current which passes through the rectifier 13 and flows into the storage battery 14 to charge the storage battery 14, so as to prolong the period of usage of the storage battery 14.

Figure 5:
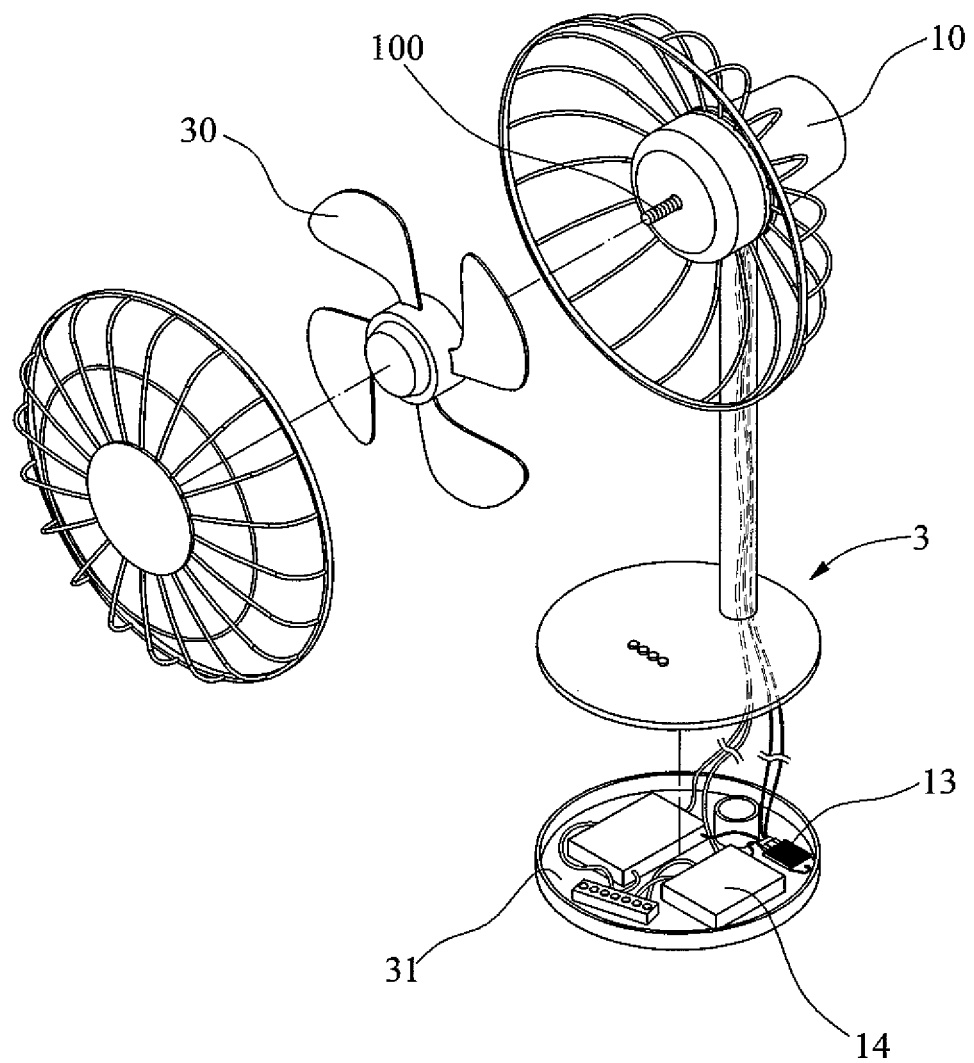
FIG. 5 is an exploded perspective view showing the electricity recharging device for a vertical fan.

Referring to FIG. 5 with reference to FIGS. 1-3, the automatic electricity recharging device 1 is assembled with a vertical (or table) fan 3. The vertical fan 3 includes an impeller 30, and a base 31. In assembly, the motor 10, the coil unit 11, the rotary disk 12 are mounted in the vertical fan 3, the impeller 30 is mounted on the front end of the motor 10, and the rectifier 13 and the storage battery 14 are placed in the base 31. In operation, when the motor 10 is operated, the elongated shaft 100 drives and rotates the impeller 30 of the vertical fan 3, and the rotary disk 12 of the automatic electricity recharging device 1 simultaneously.

Figure 6:
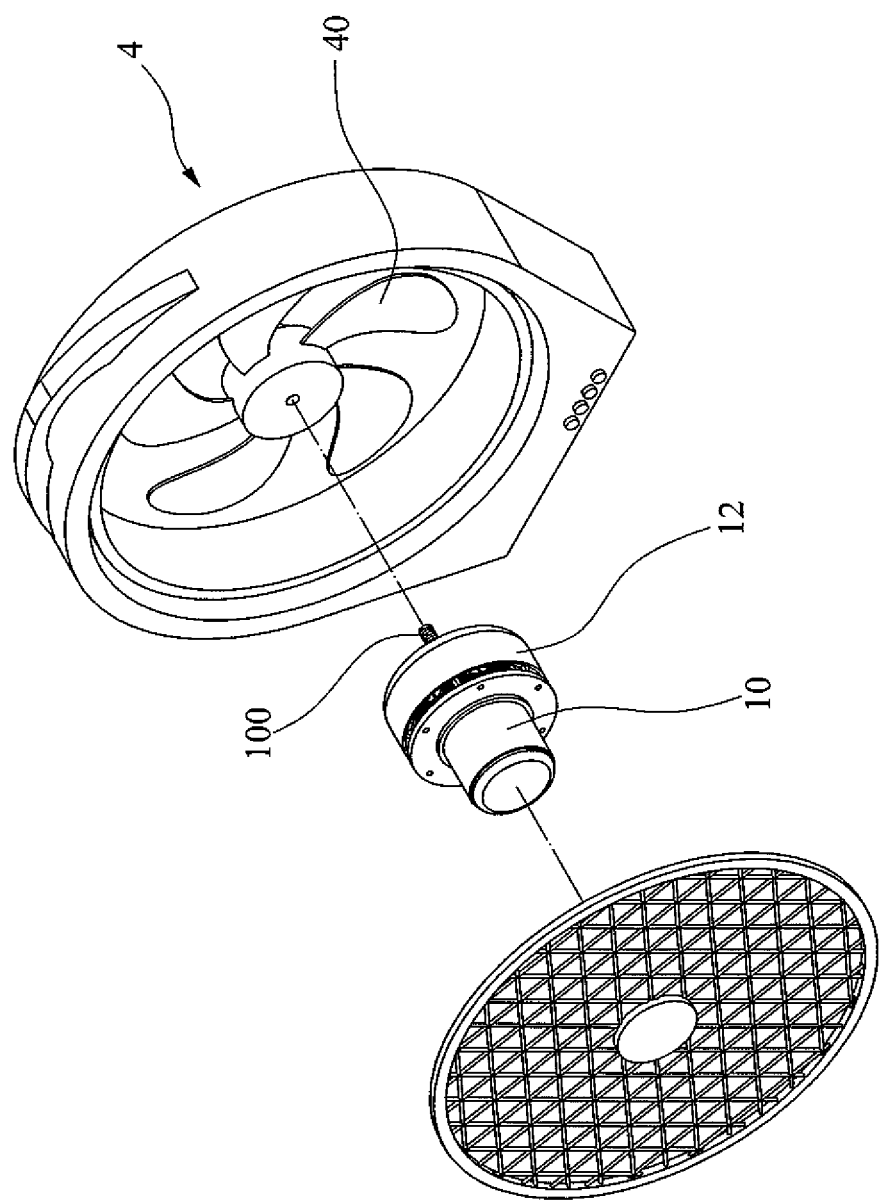
FIG. 6 is an exploded perspective view showing the electricity recharging device for a box fan.

Referring to FIG. 6 with reference to FIGS. 1-3, the automatic electricity recharging device 1 is assembled with a box fan 4. The box fan 4 includes an impeller 40, and a base (not shown). In assembly, the motor 10, the coil unit 11, the rotary disk 12 are mounted in the box fan 4, the impeller 30 is mounted on the front end of the motor 10, and the rectifier 13 and the storage battery 14 are placed in the base. In operation, when the motor 10 is operated, the elongated shaft 100 drives and rotates the impeller 40 of the box fan 4, and the rotary disk 12 of the automatic electricity recharging device 1 simultaneously.

Accordingly, the storage battery 14 provides the electric power to operate the motor 10, and the electric current is produced by rotation of the rotary disk 12 relative to the coil unit 11 and recharges the storage battery 14, to enhance the usage time of the storage battery 14. In addition, the automatic electricity recharging device 1 is used outdoors conveniently, thereby facilitating the user operates the automatic electricity recharging device 1 outdoors. Further, the distance between the at least one magnet 120 of the rotary disk 12 and the coil unit 11 is adjusted optimally between 0.6 mm and 1.2 mm, such that the proportion between the generated power and the load during operation of the motor 10 reaches the optimum value, and the generated electricity reaches the maximum value.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An electricity recharging device comprising:
a motor;
a coil unit mounted on the motor;
a rotary disk mounted on the motor;
a rectifier connected with the coil unit; and
a storage battery connected with the rectifier;
wherein:
the motor has a front end provided with an elongated shaft;
the coil unit is secured on a housing of the motor by screwing;
the coil unit includes at least one coil pole;
the rotary disk is secured on the elongated shaft of the motor and encompasses the coil unit;
the rotary disk has an interior provided with at least one magnet;
when the motor is operated, the elongated shaft drives and rotates the rotary disk relative to the coil unit;
the rectifier has at least one first electric cord electrically connected with the coil unit, and at least one second electric cord electrically connected with the storage battery; and
the storage battery has at least one electric cord electrically connected with the motor.

2. The electricity recharging device of claim 1, wherein:
a distance is defined between the at least one magnet of the rotary disk and the coil unit; and
the distance is ranged between 0.6 mm and 1.2 mm.

3. The electricity recharging device of claim 1, wherein the automatic electricity recharging device is mounted on one of an exhaust fan, a vertical fan, a table fan, and a box fan.

* * * * *